US007227117B1

(12) United States Patent
Lackemann et al.

(10) Patent No.: US 7,227,117 B1
(45) Date of Patent: Jun. 5, 2007

(54) HIGH SPEED AUTO-EXPOSURE CONTROL

(75) Inventors: Thomas Lackemann, Syaville, NY (US); Brad Carlson, Huntington, NY (US); Robert Pang, Williston, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/442,912

(22) Filed: May 30, 2006

(51) Int. Cl.
*G06K 7/10* (2006.01)
(52) U.S. Cl. .............................. 250/208.1; 235/462.26; 235/462.41
(58) Field of Classification Search ............. 250/208.1; 235/462.1, 462.24, 462.25, 462.26, 462.41, 235/455; 384/364
See application file for complete search history.

(56) References Cited

U.S. PATENT DOCUMENTS

| 5,354,977 | A  | * | 10/1994 | Roustaei ............... 235/462.11 |
| 6,729,546 | B2 | * | 5/2004  | Roustaei ............... 235/462.45 |
| 7,038,820 | B1 | * | 5/2006  | Kindt et al. ............... 358/474 |
| 2005/0253937 | A1 | * | 11/2005 | Moholt et al. ........... 348/229.1 |
| 2005/0253944 | A1 | * | 11/2005 | Olsen et al. ............... 348/297 |
| 2006/0011724 | A1 | * | 1/2006 | Joseph et al. ............... 235/454 |

* cited by examiner

*Primary Examiner*—John R. Lee
(74) *Attorney, Agent, or Firm*—Tarolli, Sundheim, Covell & Tummino LLP

(57) ABSTRACT

An imager with a two dimensional array of sensors processes illumination data from a subset of the sensors located within a selected region of the image to determine imager settings prior to acting upon a full frame of data. In this manner imager settings can be quickly determined by transferring and examining only the segment of the sensor array data.

23 Claims, 3 Drawing Sheets

HIGH SPEED AUTO-EXPOSURE CONTROL

TECHNICAL FIELD

The present invention relates generally to the field of scanners and more particularly to the field of imaging scanners that feature automatic exposure control.

BACKGROUND

Imaging scanners, or "imagers," are increasingly replacing the laser scanner many uses. This is because the imagers offer more features than laser scanners such as the ability to read two-dimensional barcodes and capturing images such as checks and identification documents. However, when processing one-dimensional barcodes, a laser scanner can often outperform an imager, especially a high-resolution imager. This is because of the additional time required for the imager to capture and process an entire image. The speed of the imager is also impacted by processing measures that are taken to improve the quality of the image so that it can be decoded. For example, many imagers include an automatic exposure time and gain control features that may require the capture and analysis of multiple images to achieve an appropriate setting prior to passing the image on for decoding. A description of the automatic exposure and gain control features can be found in U.S. Pat. Nos. 5,354,977 and 6,729,546 assigned to Symbol Technologies, Inc. and incorporated herein by reference in their entirety.

SUMMARY

An imager with a two dimensional array of sensors processes a subset of the sensors in the array for automatic exposure time and/or gain control. In this manner a satisfactory exposure time and/or gain settings can be quickly determined by loading and analyzing only a segment of the array rather than analyzing an entire frame of sensor data to arrive at proper settings.

An imager is provided that processes indicia. The imager includes a two-dimensional array of sensors capable of collecting data corresponding to an amount of light collected by the sensors during an exposure time to produce an image of a target surface at which the scanner is aimed. The two-dimensional array of sensors is capable of outputting array segment data corresponding to a segment of the two-dimensional array of sensors. A decoder inputs the array segment data during a data input period that is shorter than a period of time required to input data from the entire array of sensors. The decoder then determines a modified exposure time based on an exposure quality, such as an average light level, of the array segment data. An exposure quality controller controls a subsequent collection of light data to occur during a modified exposure time duration. The array segment from which data is taken can be defined in any manner, for example, the array segment may be a set of rows of sensors located near a center of the array and adjacent to one another. The decoder may also attempt to interpret array segment data to output information encoded in a barcode image captured by the sensors in the segment. The decoder selectively signals the array to output an enlarged frame of array data for subsequent processing.

An indicia decoder is provided that inputs data from a two-dimensional array of sensors capable of collecting data corresponding to an amount of light collected by the sensors during an exposure time to produce an image of a target surface at which the scanner is aimed. The two-dimensional array of sensors is capable of operating in a cropped frame mode in which it outputs array segment data corresponding to a segment of the two-dimensional array of sensors and an enlarged, possibly full, frame mode in which it outputs array data corresponding to the full array of sensors. The decoder includes a frame selector in communication with the array of sensors that selectively places the array in cropped frame or enlarged frame mode. The decoder also includes an exposure quality controller that inputs array segment sensor data and determines an exposure quality of the image based on the array segment sensor data. If the exposure quality is within a range of acceptable values the exposure quality controller signals the frame selector to place the array in full frame mode for a subsequent collection of light data. Alternatively, if the exposure quality is outside the range of acceptable values the exposure quality controller signals the frame selector to place the array in cropped frame mode and determines an exposure time and/or gain setting for a subsequent collection of light data with the array of sensors. In this manner, the setting convergence time is reduced by using only the cropped frame of data. The decoder may determine the exposure time or gain setting for a subsequent collection of light data by applying a preset increment to the current exposure time.

The decoder may also include a gain controller that inputs array segment sensor data and determines an exposure quality, such as an average level of light received by the sensors in the array, of the image based on the array segment sensor data. If the exposure quality is within a range of acceptable values the gain controller signals the frame selector to place the array in full frame mode for a subsequent collection of light data. Alternatively, if the exposure quality is outside the range of acceptable values the gain controller signals the frame selector to place the array in cropped frame mode and determines a gain setting for the array of light sensors during a subsequent collection of light data with the array of sensors. The decoder may determine the gain setting for a subsequent collection of light data by applying a preset increment to the current gain setting.

A method for processing indicia, apparatus for performing the method, and computer readable media having computer executable instructions stored thereon for performing the method is provided. The method processes an indicia that is present on a target surface with an imager that includes a two dimensional array of light sensors that collects light data corresponding to light reflected back to the imager from the target surface during an exposure time to produce light sensor data corresponding to an image of the target surface. A subset of light sensors is selected from the two dimensional array to be used to determine an appropriate duration of the exposure time. Light sensor array data is collected with the array of sensors during the exposure time and is input to an exposure quality controller. The duration of the exposure time or gain setting is determined based on light data from sensors in the selected subset of light sensors.

These and other objects, advantages, and features of the exemplary embodiment of the invention are described in detail in conjunction with the accompanying drawings.

DETAILED DESCRIPTION

Figure 1:
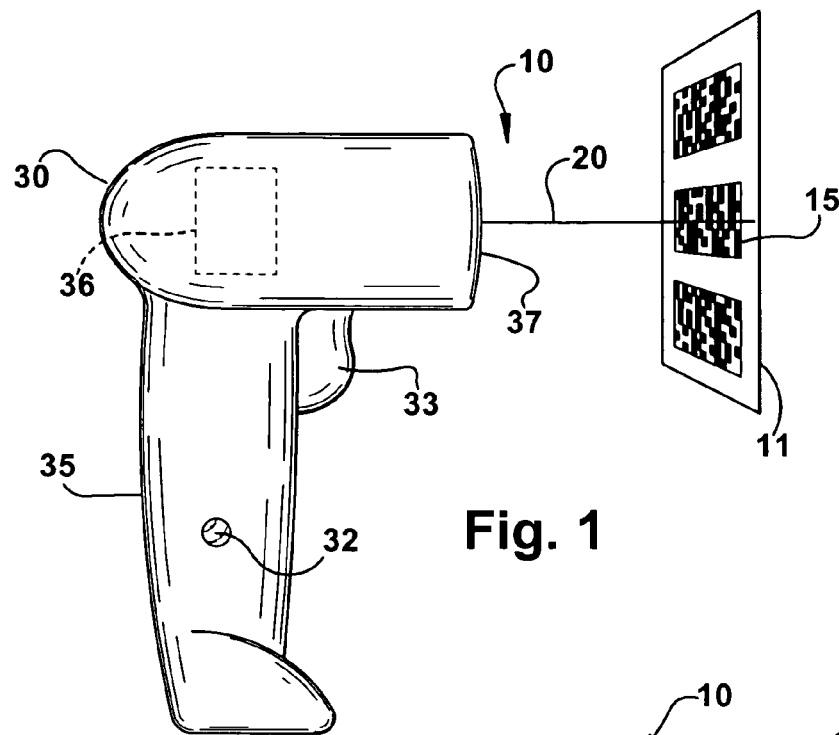
FIG. 1 is a side view of a handheld imaging scanner acting upon a two-dimensional barcode.

FIG. 1 shows a handheld imaging scanner 10 acting upon a surface 11 having a plurality of two-dimensional barcodes 15. For the purposed of this description, a handheld imaging scanner will be discussed. However, it will be apparent to one of ordinary skill in the art that the techniques and devices described herein can be practiced advantageously with stationary or bi-optic imaging scanners. The handheld imaging scanner 10 includes a housing 30 having a handle portion 35 adapted to be gripped by a user. A scan engine 36 that includes scanner components that perform functions such as imaging, control, and optionally, decoding is mounted within the head of the scanner. A user actuated mode switch 32 is also located on the handle portion.

The imaging scanner emits a focused aiming line 20 that is aimed by the user at the particular barcode 15 that is presently being read. The aiming pattern can be activated by a trigger 33, followed by full-scale illumination of the target area. Alternatively, the aiming pattern can be active at all times in which case the trigger 33 activates full-scale illumination of the target. In addition, the aiming pattern can be activated upon the detection of motion in a sequence of images. The light emitted from the scanner exits the scanner through a window 37 and light reflected back from the target surface passes through the window to imaging components within the scanner.

Figure 2:
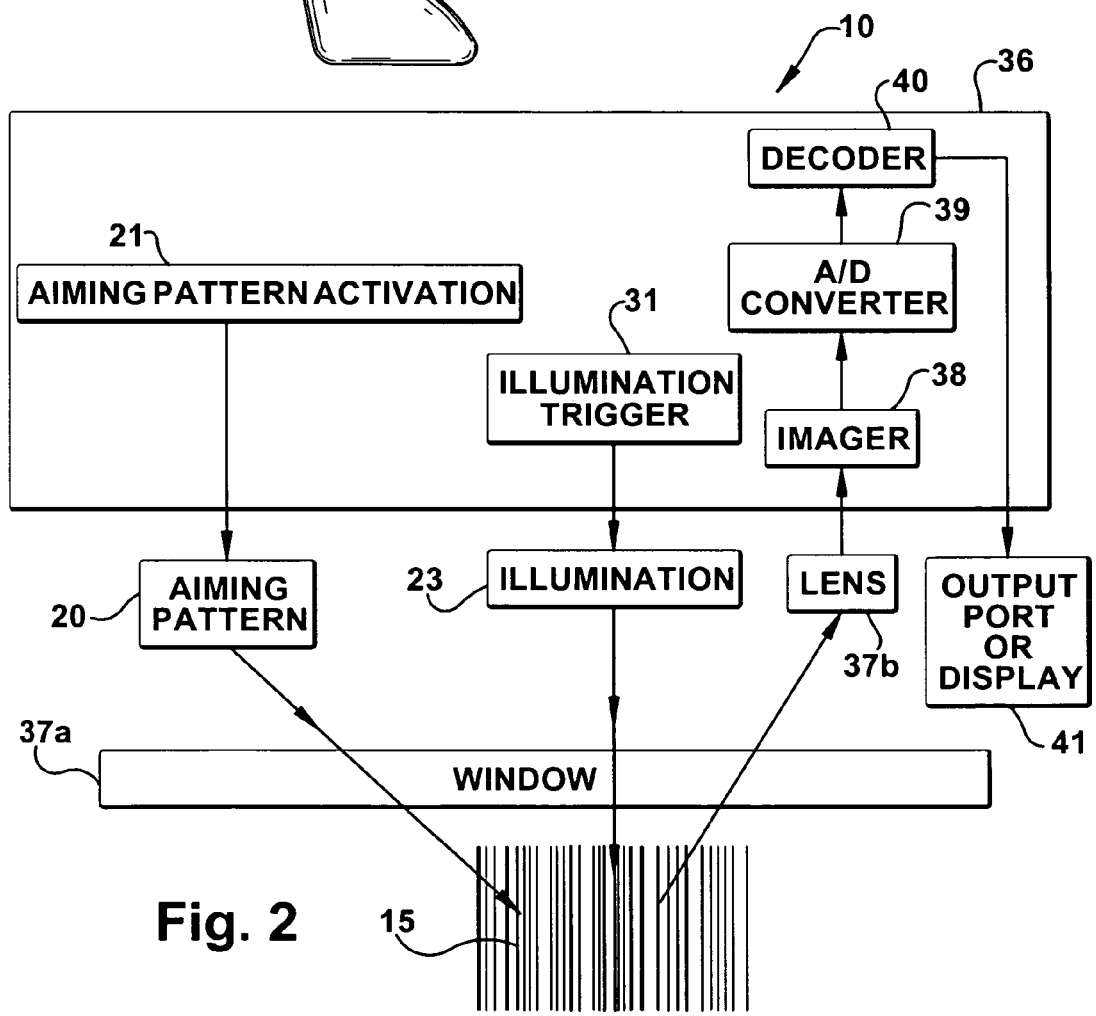
FIG. 2 is a functional block diagram of an imaging scanner constructed in accordance with an embodiment of the present invention.

FIG. 2 is a functional block diagram of an imaging scanner that initially processes a subset of the image data. The imager may attempt to decode a barcode located in the center of the image or adjust various imager parameters prior to capturing a subsequent image to increase the likelihood of a successful decode. The scan engine 36 includes an imager 38 having a two-dimensional array of sensors such as CCD or CMOS sensors that sense light reflected back from the target surface and form pixel data corresponding to an image of the target. The sensor array is equipped with an array controller that controls array parameters such as exposure time and gain settings. Many scanners include automatic exposure and gain control software that determine proper settings for these parameters based on the quality of the image currently being processed. For the automatic exposure control, the exposure time of the sensor array is varied in successive images until an acceptable exposure for the scene is obtained. When the exposure time is at its maximum value and the image is still too dark, the automatic gain control increases the gain of the array's output stage to attempt to obtain an image signal of sufficient strength to decode. The array controller is also able to select a frame corresponding to a subset of the image pixels and to output that portion of pixels upon request, so that the transfer time and processing time can be shortened by acting on a subset of pixel data rather than the whole array of pixel data. One such sensor array is a CMOS array made by Micron having part number MT9M001.

The pixel data from the array is converted into digital data by an A/D converter 39 that is decoded by decoder 40. The A/D converter 39 and decoder 40 are not incorporated in all scan engines and may be housed in separate scanner components. in addition to decoding the digital data, the decoder may also perform image analysis to generate array signals such as the automatic exposure and gain control functions and frame selection function described above. An output port or display 41 provides the results of decoding to a peripheral device (not shown) or displays them to the user. The scanner 10 also includes an illumination source 23 that is capable, within a prescribed scanner range, of illuminating a portion of the target surface sufficient to fill the entire two-dimensional array of sensors with data.

Figure 3:
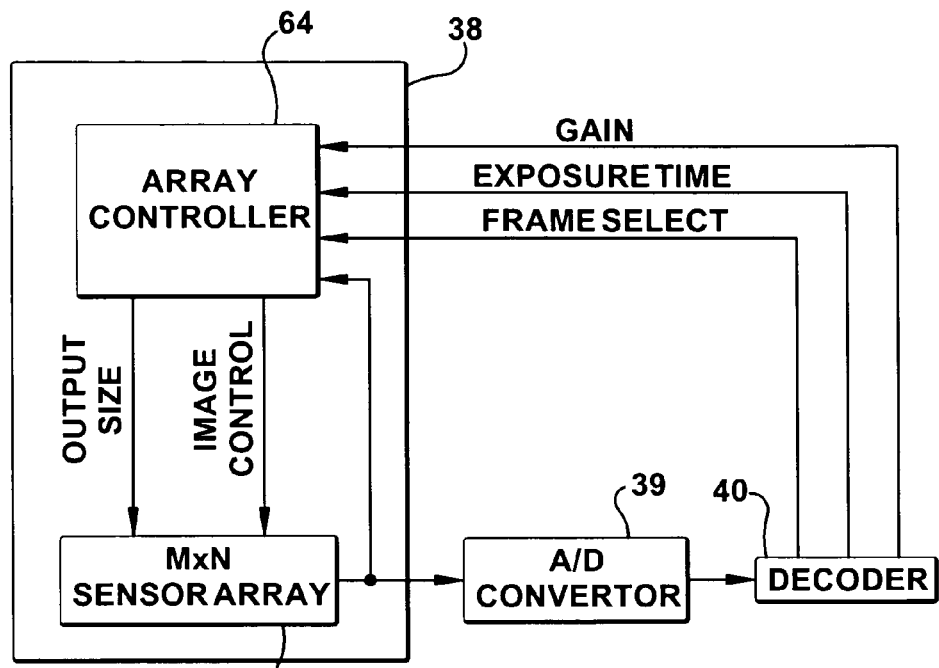
FIG. 3 is a schematic view of imaging scanner components that perform auto-exposure control according to an embodiment of the present invention.

FIG. 3 is a schematic illustration of the imager 38 that shows the sensor array 62 and its controller 64 that sets various operating parameters on the array. Most sensor arrays include exposure control and gain control settings that are determined by the decoder as discussed above. For AEC, an average level of pixel brightness is determined and if the brightness is below a threshold level, the exposure time is increased. Likewise, for AGC, the gain on amplification components in the array output stage is increased if the signal received from the array is not sufficiently bright to decode. According to current imager technology, the array controller 64 outputs and the decoder analyzes an entire frame of M×N pixel data to make the brightness determination. The transfer time and processing time for such a large number of pixels is burdensome, especially when several iterations are necessary to achieve proper exposure.

Figure 5:
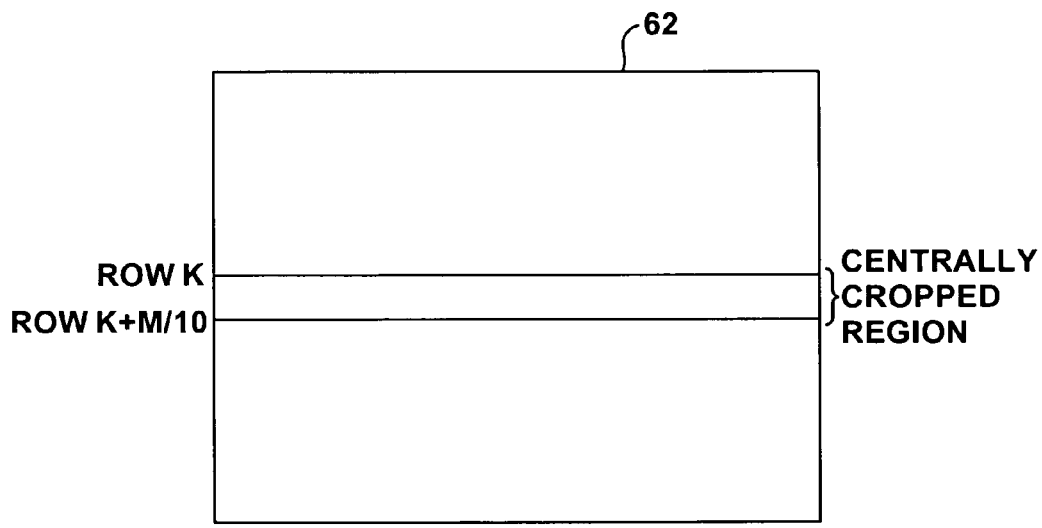
FIG. 5 is a schematic illustration of a sensor array of an imaging scanner constructed in accordance with an embodiment of the present invention.

To streamline the AEC process, the frame selection feature of the array is utilized. As shown in FIG. 5, the array controller skips a first number K rows and then outputs a middle M/10, or ten percent, of rows for brightness analysis so that only rows K through K+M/10 are output, transferred, and analyzed. Once the proper exposure is achieved, a full image can be output for decoding if necessary. Based on the present state of imager technology, the portion of pixel data can be acquired every 5 milliseconds as opposed to every 30 milliseconds for full frames of pixel data, resulting in approximately a six-fold reduction in AEC processing time. The selection of the center ten percent of rows of pixels has been chosen for AEC analysis based on the intuition that a user will generally center the imager frame around the target indicia. However, it will be apparent to one of skill in the art that any portion of pixel data in any configuration can be used for AEC to increase image processing speed.

Figure 4:
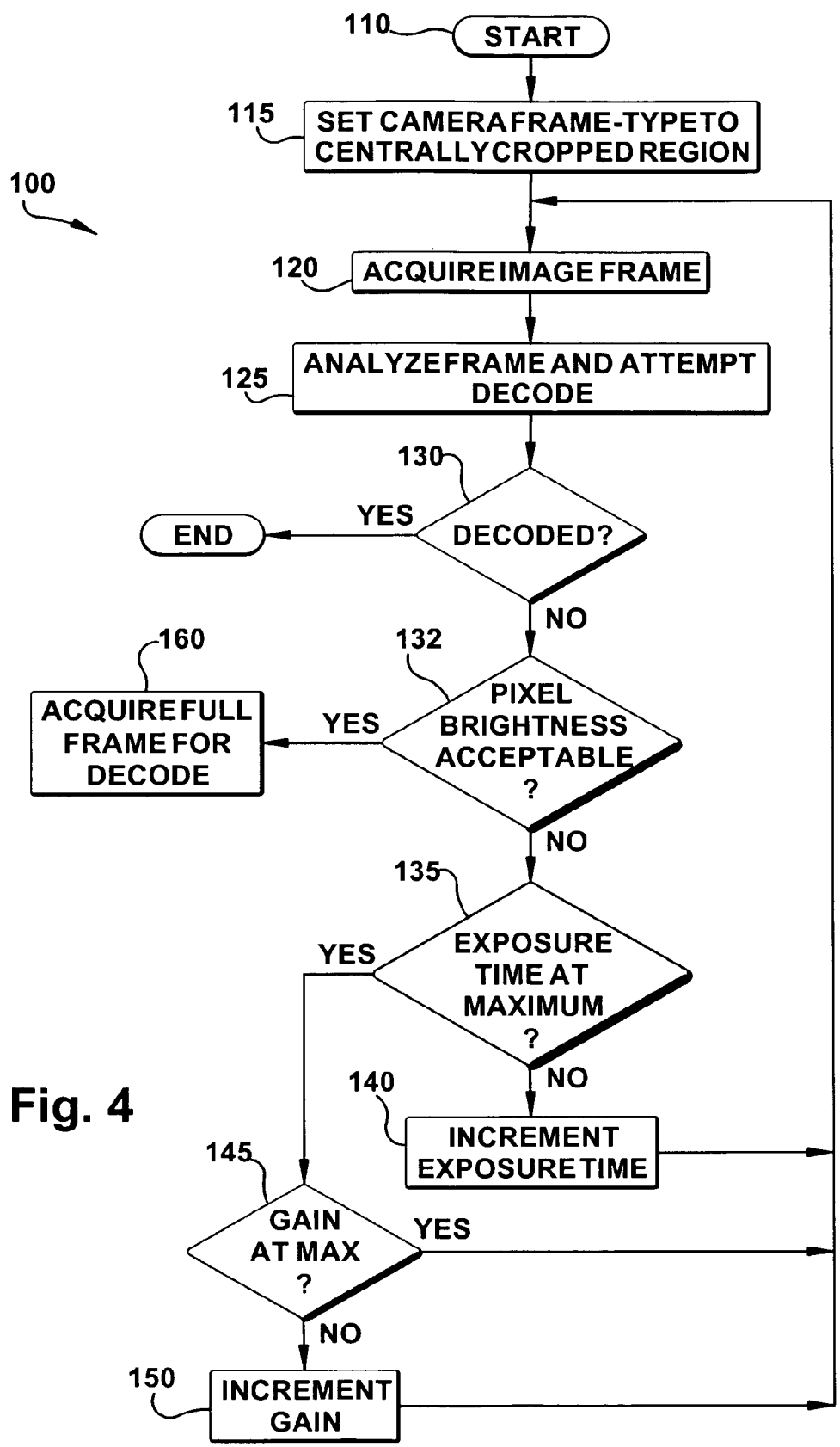
FIG. 4 is a flowchart illustrating a method of operating an imaging scanner according to embodiments of the present invention.

FIG. 4 outlines an image processing routine 100 that includes the analysis of a portion of pixel data for both an initial decode attempt and auto-exposure analysis. At 110 the routine starts and at 115 the array controller selects the centrally cropped region defined by the center ten percent of rows of the sensor array by instructing the array to skip the first 45% of the rows prior to reading out pixel data and then outputting only the next 10% of the rows. At 120 the pixel data from the selected rows is acquired. At 125 and 130, the data from the selected rows is sent to the decoder which attempts to decode the data. If the target indicia is a 1-D barcode and the user has oriented the frame so that it is parallel to the horizontal axis of the barcode and the barcode is centered in the frame, it is possible that this decode will be successful, and if so the processing routine ends.

If the portion of pixel data cannot be decoded, at 132, some determination is regarding whether the current exposure time is sufficient to capture an image that is acceptable for decoding. For example, the decoder may determine pixel brightness using the same techniques currently employed for analyzing full frames of pixel data. Of course, alternative pixel analysis techniques that can be used to determine proper exposure time could also be practiced on the subset of pixel data acquired at 120. If at 132, the pixel brightness is within the acceptable range, at 160 a full image is acquired and passed to the decoder for full scale decoding.

If the pixel brightness is insufficient, at 135 the present exposure time setting is compared to the maximum allowable exposure time. If the exposure time can be increased, at 140 the exposure time is increased by a preset increment, such as 6.26% of the maximum time and another cropped frame of pixel data is acquired at 120. If the exposure time is already at its maximum value, at 145 the present gain setting is compared to its maximum allowable value. If the gain can be increased, it is increased by a preset increment at 150 and another cropped frame of pixel data is acquired at 120. It will be appreciated by one of skill in the art that the precise order in which adjustments are made to the exposure time and gain can be varied, for example by increasing gain first and then exposure time if the gain setting increase is not sufficient.

The imager thus intakes and analyzes a relatively small subset of pixel data to attempt to decode the indicia in the target region. If the indicia is not decoded, the same subset of pixel data is used to adjust the exposure time and gain of the array to increase the likelihood of a successful decode in subsequent scans. Once the image is of sufficient quality, data from an enlarged or the entire array or a subsequent cropped frame of the array can be decoded with greater confidence.

It can be seen from the foregoing description that an imaging scanner that uses a subset of pixel data from the imager to determine proper imager settings will have increased operating speed. Although the invention has been described with a certain degree of particularity, it should be understood that various changes can be made by those skilled in the art without departing from the spirit or scope of the invention as hereinafter claimed.

We claim:

1. An imager that processes indicia comprising:
    a two-dimensional array of sensors capable of collecting data corresponding to an amount of light collected by the sensors during an exposure time to produce an image of a target surface at which the scanner is aimed and wherein the two-dimensional array of sensors is capable of outputting array segment data corresponding to a segment of the two-dimensional array of sensors, the segment corresponding to a set of adjacent rows of sensors located about a center of the array of sensors, the set of adjacent rows of sensors comprising not more than 10% of a total number of rows of sensors of the array, and enlarged array data corresponding to data from a predetermined increased number of the sensors in the array;
        a decoder that inputs the array segment data during a data input period that is shorter than a period of time required to input the enlarged array data and wherein the decoder determines a modified exposure time based on an exposure quality of the array segment data;
        an exposure quality controller that controls a subsequent collection of light data to occur during a modified exposure time duration; and
        wherein the decoder selectively sends control signals to the array to cause it to output the enlarged array data for subsequent indicia processing.
2. The imager of claim 1 wherein the segment is a set of rows of sensors located near a center of the array.

3. The imager of claim 2 wherein the rows are adjacent to one another.

4. The imager of claim 2 wherein the sensor exposure quality is an average light level of the sensors in the segment.

5. The imager of claim 1 wherein the decoder interprets array segment data to output information encoded in a barcode image captured by the sensors in the segment.

6. The imager of claim 1 wherein the enlarged array data corresponds to data from substantially all of the sensors in the array.

7. An indicia decoder and two-dimensional array of sensors comprising:
    the two-dimensional array of sensors capable of collecting data corresponding to an amount of light collected by the sensors during an exposure time to produce an image of a target surface at which the scanner is aimed and wherein the two-dimensional array of sensors is capable of operating in a cropped frame mode in which it outputs array segment data corresponding to a first segment of the two-dimensional array of sensors, the first segment corresponding to a set of adjacent rows of sensors located about a center of the array of sensors, the set of adjacent rows of sensors comprising not more than 10% of a total number of rows of sensors of the array, and an enlarged frame mode in which it outputs array data corresponding to second, larger segment of array of sensors;
    the decoder inputting data from the two-dimensional array of sensors and comprising:
    a frame selector in communication with the array of sensors that selectively places the array in cropped frame or enlarged frame mode;
    an exposure quality controller that inputs array segment sensor data, determines an exposure quality of the image based on the array segment sensor data and wherein if the exposure quality is within a range of acceptable values the exposure quality controller signals the frame selector to place the array in full frame mode for a subsequent collection of light data; and wherein if the exposure quality is outside the range of acceptable values, the exposure quality controller signals the frame selector to place the array in cropped frame mode and determines one of a modified exposure time and gain setting for a subsequent collection of light data with the array of sensors; and
    wherein the frame selector selectively sends control signals to place the array enlarged frame mode for subsequent indicia processing once the exposure quality is within the range of acceptable values.

8. The decoder of claim 7 wherein the exposure quality is an average level of light received by the sensors in the array.

9. The decoder of claim 7 wherein the decoder determines an exposure time setting for a subsequent collection of light data by applying a preset increment to the current exposure time.

10. The decoder of claim 8 wherein the decoder determines a gain setting for a subsequent collection of light data by applying a preset increment to the current gain setting.

11. The decoder of claim 7 wherein the second segment of the array corresponds to substantially the entire array.

12. A method that processes an indicia that is present on a target surface with an imager that includes a two dimensional array of light sensors that collects light data corresponding to light reflected back to the imager from the target surface during an exposure time to produce light sensor data corresponding to an image of the target surface, the method comprising:

selecting a first subset of light sensors from the two dimensional array to be used to determine an appropriate duration of the exposure time, the first subset of light sensors corresponding to a set of adjacent rows of light sensors located about a center of the array of light sensors, the set of adjacent rows of light sensors comprising not more than 10% of a total number of rows of light sensors of the array;

collecting light sensor array data with the array of sensors during the exposure time;

inputting light data from the selected first subset of light sensors to an exposure quality controller;

adjusting at least one of the duration of the exposure time and an output component gain setting based on light data from sensors in the selected first subset of light sensors; and selecting a second, larger, subset of light sensors and inputting light data from the second subset of light sensors in subsequent indicia processing.

13. The method of claim 12 wherein data from the subset of light sensors is input to the exposure quality controller by skipping a first number of rows of sensors prior to transferring sensor data to the exposure quality controller.

14. The method of claim 12 wherein the at least one of the duration of the exposure time and the output component gain setting is adjusted by calculating an average sensor signal level and comparing the average signal level to a pre-selected minimum signal and increasing the at least one of exposure time duration and output component gain setting in a subsequent collection of light sensor data when the average signal level is less than the minimum signal.

15. The method of claim 12 comprising decoding the data from the first subset of light sensors to determine information encoded in the indicia.

16. An apparatus for processing an indicia that is present on a target surface with an imager that includes a two dimensional array of light sensors that collects light data corresponding to light reflected back to the imager from the target surface during an exposure time to produce light sensor data corresponding to an image of the target surface, the apparatus comprising:

means for selecting a first subset of light sensors from the two dimensional array to be used to determine an appropriate duration of the exposure time, the first subset of light sensors corresponding to a set of adjacent rows of light sensors located about a center of the array of light sensors, the set of adjacent rows of sensors comprising not more than 10% of a total number of rows of light sensors of the array;

means for collecting light sensor array data with the array of sensors during the exposure time;

means for inputting light data from the selected first subset of light sensors to an exposure quality controller;

means for adjusting at least one of the duration of the exposure time and an output component gain setting based on light data from sensors in the selected first subset of light sensors; and means for selecting a second, larger, subset of light sensors and wherein the means for inputting light data inputs data from the second subset of light sensors in subsequent indicia processing.

17. The apparatus of claim 16 wherein the means for inputting light data includes means for skipping a first number of rows of sensors prior to transferring sensor data to the exposure quality controller.

18. The apparatus of claim 16 wherein the means for adjusting the at least one of the duration of the exposure time and an output component gain setting includes means for calculating an average sensor signal level and means for comparing the average signal level to a pre-selected minimum signal and wherein the means for adjusting the at least one of the duration of the exposure time and an output component gain setting increases the at least one of the duration of the exposure time and an output component gain setting in a subsequent collection of light sensor data when the average signal level is less than the minimum signal.

19. The apparatus of claim 16 comprising means for decoding the data from the first subset of light sensors to determine information encoded in the indicia.

20. For use with an imager that includes a two dimensional array of light sensors that collects light data corresponding to light reflected back to the imager from a target surface during an exposure time to produce light sensor data corresponding to an image of the target surface, computer readable media having computer-executable instructions stored thereon for performing steps to process an indicia that is present on the target surface, the steps comprising:

selecting a first subset of light sensors from the two dimensional array to be used to determine an appropriate duration of the exposure time, the first subset of light sensors corresponding to a set of adjacent rows of light sensors located about a center of the array of light sensors, the set of adjacent rows of sensors comprising not more than 10% of a total number of rows of light sensors of the array;

collecting light sensor array data with the array of sensors during the exposure time;

inputting light data from the selected first subset of light sensors to an exposure quality controller;

adjusting at least one of the duration of the exposure time and an output component gain setting based on light data from sensors in the selected first subset of light sensors; and selecting a second, larger, subset of light sensors and inputting light data from the second subset of light sensors in subsequent indicia processing.

21. The computer readable media of claim 20 wherein data from the first subset of light sensors is input to the exposure quality controller by skipping a first number of rows of sensors prior to transferring sensor data to the exposure quality controller.

22. The computer readable media of claim 20 wherein the at least one of the duration of the exposure time and output component gain setting is adjusted by calculating an average sensor signal level and comparing the average signal level to a pre-selected minimum signal and increasing the at least one of the duration of the exposure time and output component gain setting in a subsequent collection of light sensor data when the average signal level is less than the minimum signal.

23. The computer readable media of claim 20 wherein the steps include decoding the data from the first subset of light sensors to determine information encoded in the indicia.

* * * * *